United States Patent
Fujii et al.

(10) Patent No.: US 7,542,646 B2
(45) Date of Patent: *Jun. 2, 2009

(54) OPTICAL WAVEGUIDE AND METHOD OF MANUFACTURING THE SAME

(75) Inventors: Akira Fujii, Kanagawa (JP); Toshihiko Suzuki, Kanagawa (JP); Keishi Shimizu, Kanagawa (JP); Kazutoshi Yatsuda, Kanagawa (JP); Shigemi Ohtsu, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/033,039

(22) Filed: Feb. 19, 2008

(65) Prior Publication Data

US 2008/0232753 A1 Sep. 25, 2008

(30) Foreign Application Priority Data

Mar. 22, 2007 (JP) ............................. 2007-075287

(51) Int. Cl.
*G02B 6/10* (2006.01)
*G02B 6/12* (2006.01)
*G02B 6/26* (2006.01)
*G02B 6/42* (2006.01)

(52) U.S. Cl. ........................... 385/129; 385/14; 385/47; 385/48

(58) Field of Classification Search ................ 385/129, 385/31, 14, 50, 47, 48; 264/1
See application file for complete search history.

(56) References Cited

U.S. PATENT DOCUMENTS

| | | | |
|---|---|---|---|
| 5,872,883 A | 2/1999 | Ohba et al. | |
| 6,259,841 B1 | 7/2001 | Bhagavatula | |
| 6,741,781 B2 | 5/2004 | Furuyama | |
| 6,801,701 B1 * | 10/2004 | Montgomery et al. | 385/129 |
| 6,973,248 B2 | 12/2005 | Kropp | |
| 6,993,213 B2 | 1/2006 | Takagi | |
| 7,164,824 B2 * | 1/2007 | Rasras et al. | 385/50 |
| 7,206,470 B2 * | 4/2007 | Li et al. | 385/14 |
| 7,242,822 B2 * | 7/2007 | Yamada et al. | 385/14 |
| 7,308,180 B2 * | 12/2007 | Fujii et al. | 385/129 |
| 7,324,723 B2 * | 1/2008 | Shioda et al. | 385/31 |
| 2003/0179991 A1 | 9/2003 | Baba et al. | |
| 2004/0245660 A1 * | 12/2004 | Ohtsu et al. | 264/1.27 |
| 2005/0175304 A1 | 8/2005 | Romagnoli et al. | |

(Continued)

FOREIGN PATENT DOCUMENTS

JP 9-145943 A 6/1997

(Continued)

*Primary Examiner*—Frank G Font
*Assistant Examiner*—Robert Tavlykaev
(74) *Attorney, Agent, or Firm*—Sughrue Mion, PLLC

(57) ABSTRACT

There is provided an optical waveguide including: a waveguide core through which light propagates; a cavity that is present inside the waveguide core so as to be open at least one end in the thickness direction of the waveguide core; a layer-form first cladding having a lower refractive index than the waveguide core, and sealing at least one of the at least one opening of the cavity to thereby close the opening of the cavity; and a second cladding having a lower refractive index than the waveguide core, and surrounding the waveguide core. There is also provided a method of manufacturing the optical waveguide.

10 Claims, 8 Drawing Sheets

U.S. PATENT DOCUMENTS

| | | |
|---|---|---|
| 2005/0226562 A1 | 10/2005 | Romagnoli et al. |
| 2006/0091571 A1* | 5/2006 | Akutsu et al. ............... 264/1.24 |
| 2006/0182399 A1* | 8/2006 | Lin et al. .................... 385/129 |
| 2007/0292091 A1* | 12/2007 | Fujii et al. .................. 385/129 |

FOREIGN PATENT DOCUMENTS

| | | |
|---|---|---|
| JP | 11-248951 A | 9/1999 |
| JP | 2002-333538 A | 11/2002 |
| JP | 2003-75670 A | 3/2003 |
| JP | 2003-207661 A | 7/2003 |

\* cited by examiner

OPTICAL WAVEGUIDE AND METHOD OF MANUFACTURING THE SAME

CROSS-REFERENCE TO RELATED APPLICATIONS

This application is based on and claims priority under 35 USC 119 from Japanese Patent Application No. 2007-075287 filed Mar. 22, 2007.

BACKGROUND

1. Technical Field

The present invention relates to an optical waveguide and a method of manufacturing the same.

2. Related Art

In the transmission of high-speed signals, since electrically carried signals are approaching a limit, optical transmission is expected to play a role. Under such circumstances, realization of optelectric circuit boards is urgently needed. Optical waveguides applicable to highly integrated electric devices are required in order to realize such optelectric circuit boards. Realization of large conversion in the direction of propagation within a small area in the restriction imposed by such integration is required, and polymer waveguides, which have a higher degree of design freedom than quartz waveguides, are therefore advantageous.

As a method of largely changing the direction of propagating light in a small area, enlarging the total reflection conditions by locally using a cladding whose difference in refractive index from the core is large has been considered.

SUMMARY

According to an aspect of the invention, there is provided an optical waveguide including: a waveguide core through which light propagates; a cavity that is present inside the waveguide core so as to be open at least one end in the thickness direction of the waveguide core; a layer-form first cladding having a lower refractive index than the waveguide core, and sealing at least one of the opening(s) of the cavity to thereby close the opening of the cavity; and a second cladding having a lower refractive index than the waveguide core, and surrounding the waveguide core.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described with reference to the drawings. Members having substantially the same function and workings are denoted by the same reference designations throughout the drawings, and overlapping descriptions are sometimes omitted.

Figure 1:
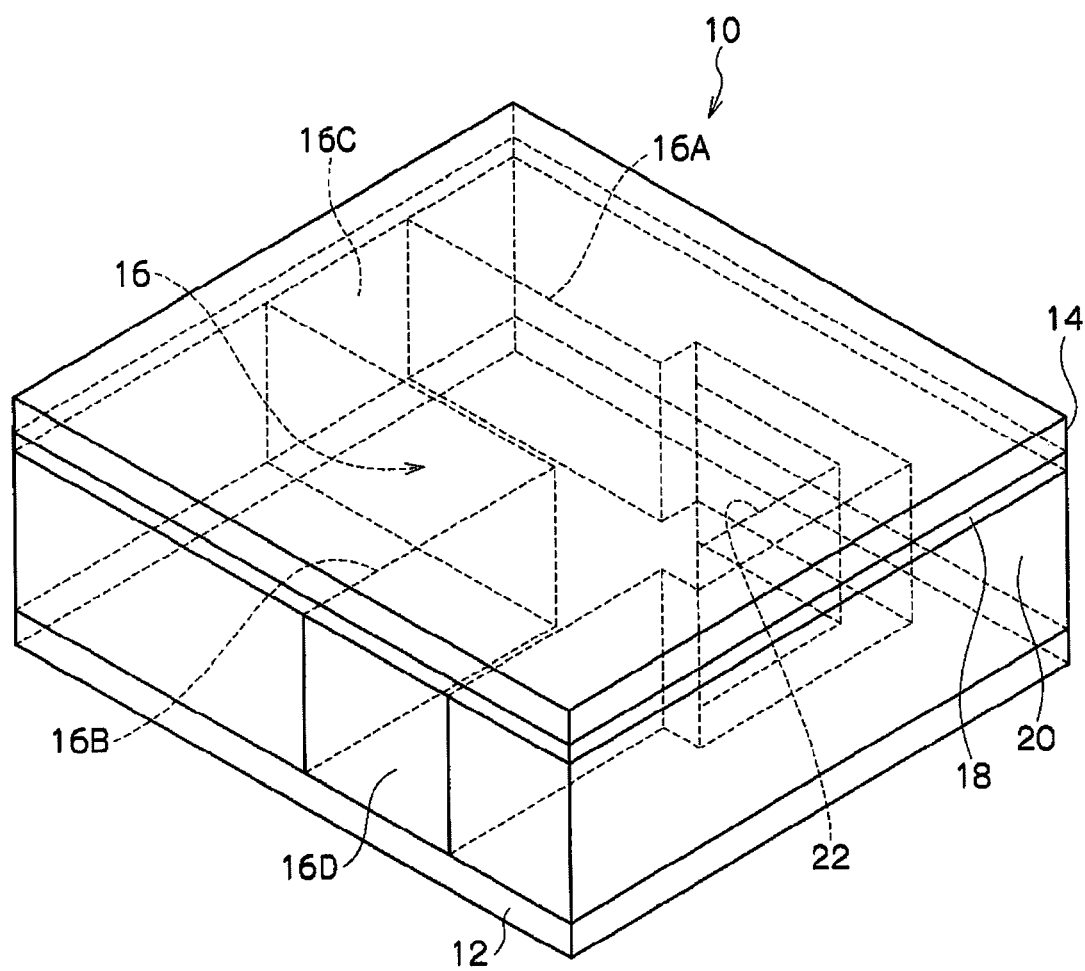
FIG. 1 is a perspective view showing an optical waveguide according to an exemplary embodiment.
Figure 2:
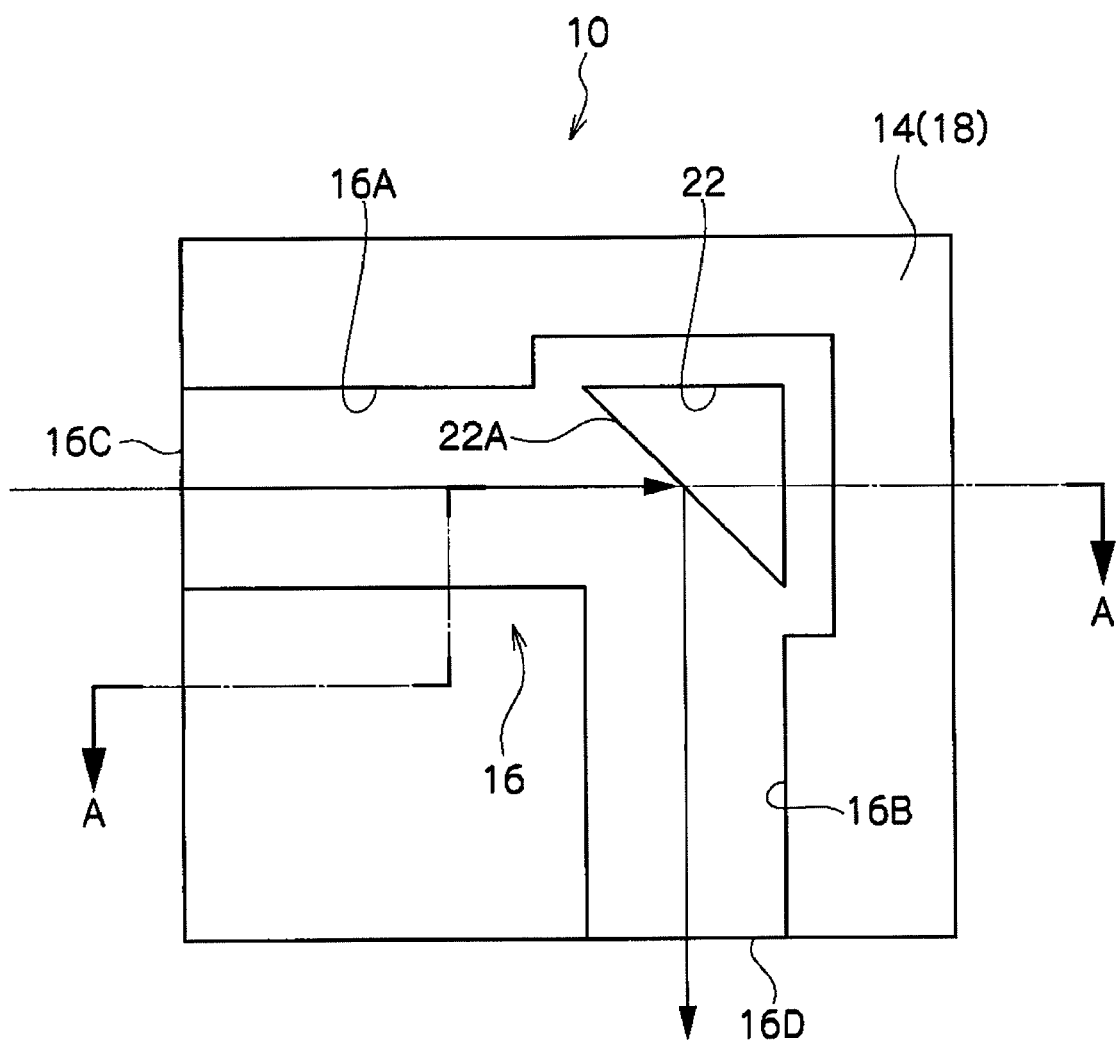
FIG. 2 is a plan view showing the optical waveguide according to the exemplary embodiment.
Figure 3:
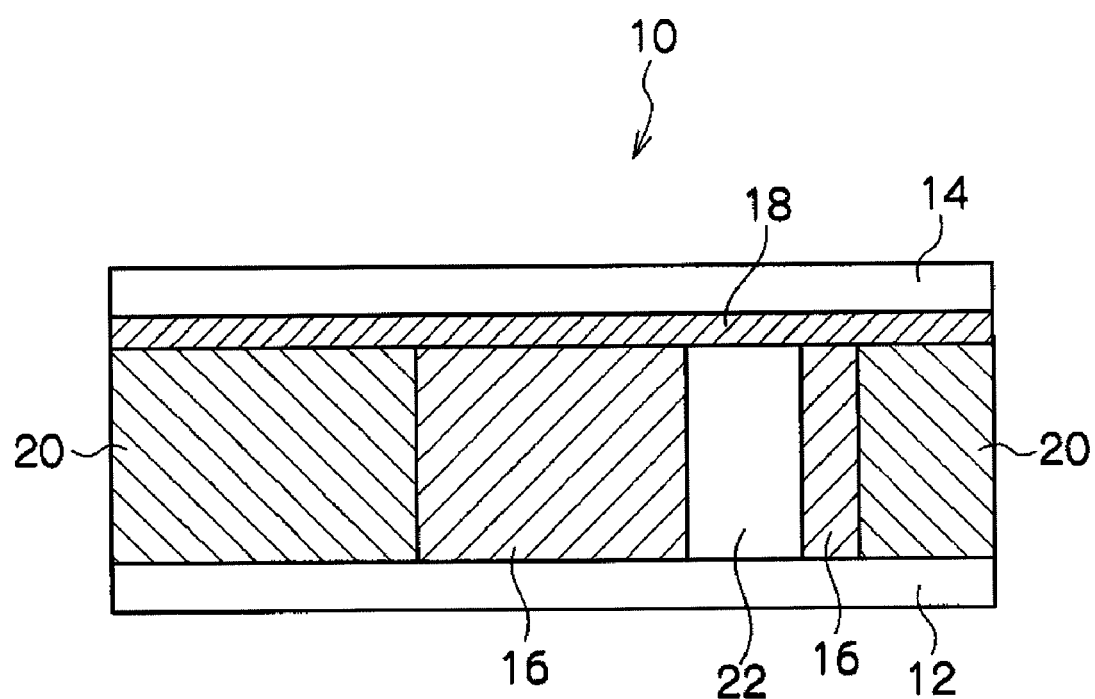
FIG. 3 is a partial cross-sectional view showing the optical waveguide according to the exemplary embodiment.

FIG. 1 is a perspective view showing an optical waveguide according to the exemplary embodiment. FIG. 2 is a plan view showing the optical waveguide according to the exemplary embodiment. FIG. 3 is a partial cross-sectional view showing the optical waveguide according to the exemplary embodiment, taken along the line A-A of FIG. 2.

As shown in FIGS. 1 to 3, the optical waveguide 10 according to the exemplary embodiment includes a lower cladding substrate 12 (first substrate) and an upper cladding substrate 14 (second substrate). Between the substrates 12 and 14, a waveguide core 16 propagating light and a second cladding 20 formed so as to surround the waveguide core 16 are provided.

The waveguide core 16 includes two main waveguide cores 16A and 16B coupled so as to cross each other (in the present exemplary embodiment, at a right angle) at one ends thereof to form an L-shape. A cavity 22 is disposed in the part where the main waveguide cores 16A and 16B are coupled together. The cavity 22 is constituted by a space surrounded by the waveguide core 16. The cavity 22 is open on both of the side facing the lower cladding substrate 12 (first substrate) and the side facing the upper cladding substrate 14 (second substrate) (that is, open in both of the directions along the thickness of the waveguide core 16). The opening on the side of the lower cladding substrate 12 is sealed by being sealed by the lower cladding substrate 12. The opening on the side of the upper cladding substrate 14 is sealed by a layer-form first cladding 18. It is to be noted that the first cladding 18 may seal the opening on the side of the lower cladding substrate 12 by sealing it.

Figure 6:
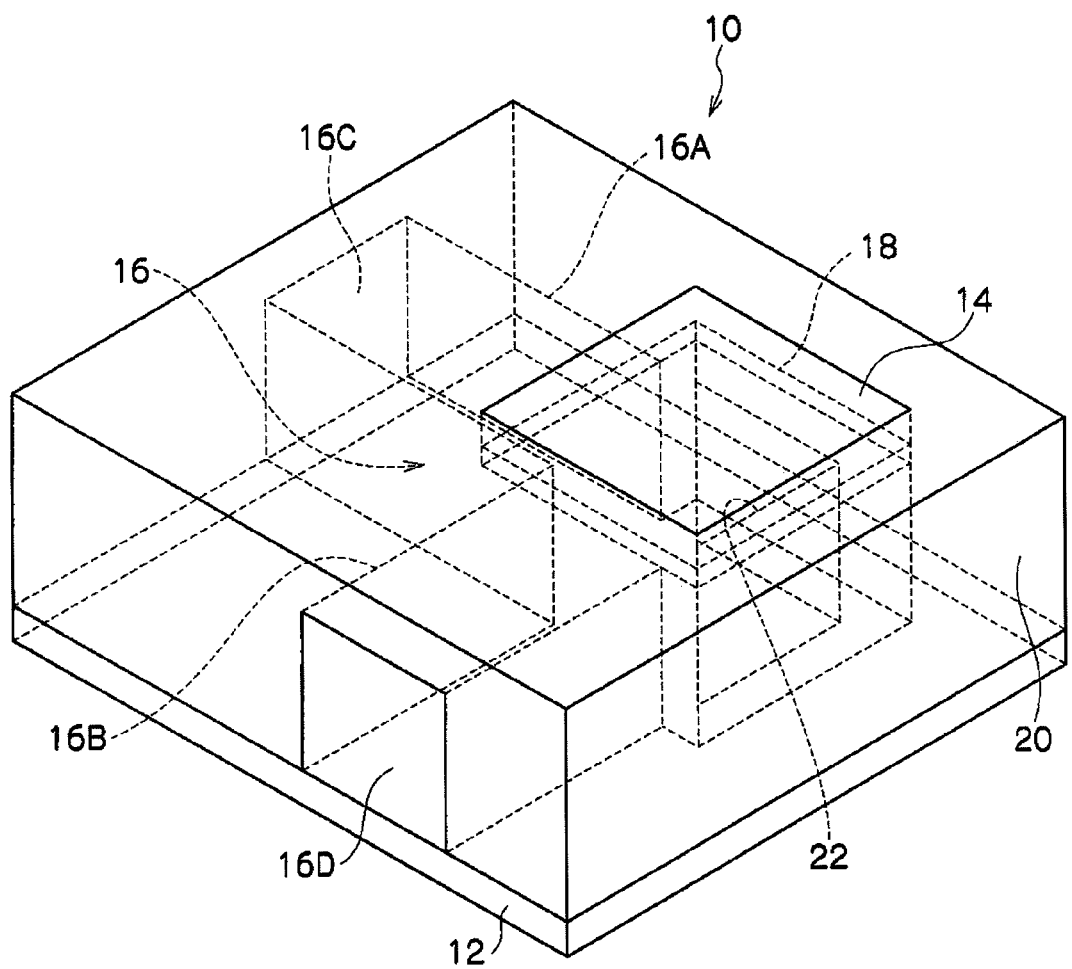
FIG. 6 is a perspective view showing an optical waveguide according to another exemplary embodiment.
Figure 7:
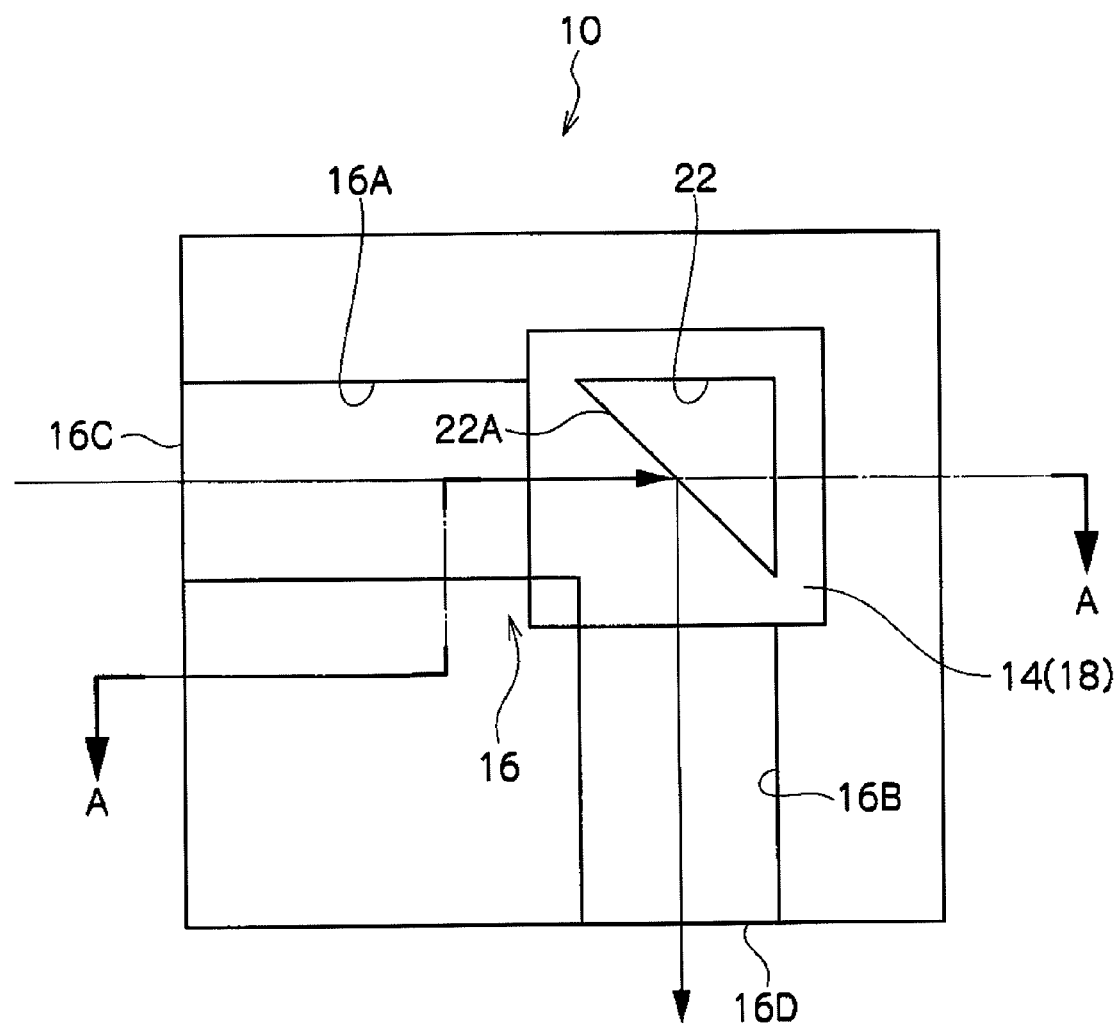
FIG. 7 is a plan view showing the optical waveguide according to another exemplary embodiment.
Figure 8:
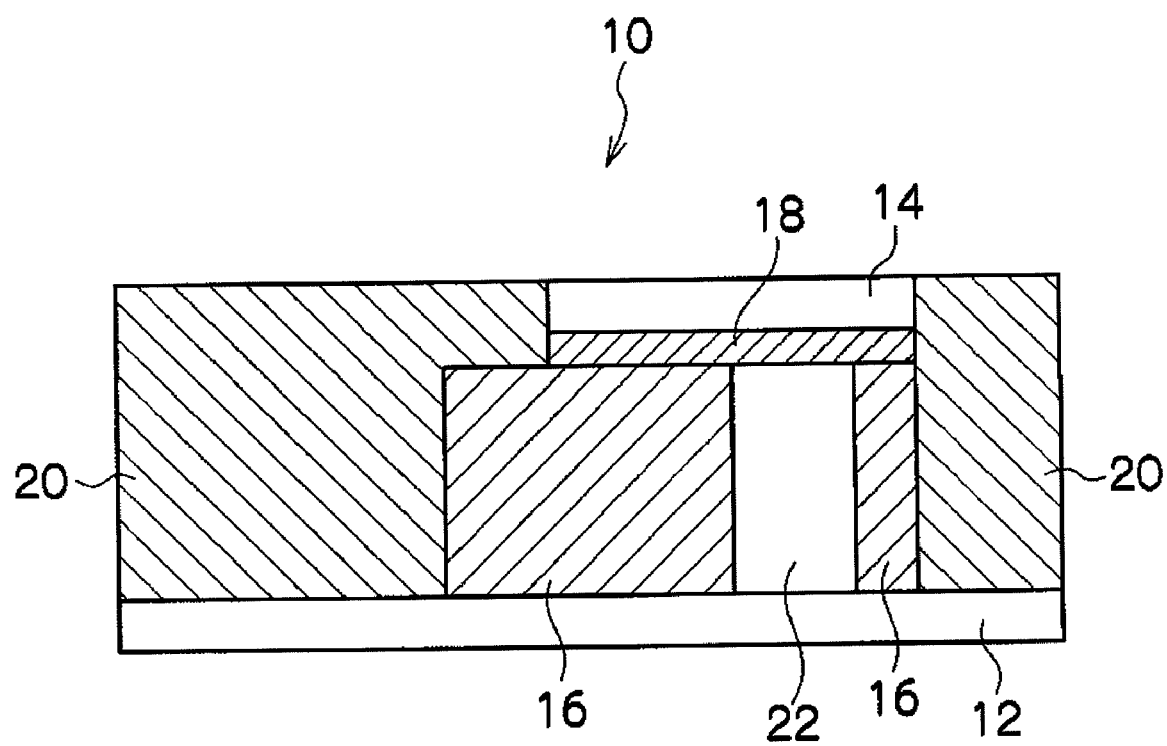
FIG. 8 is a partial cross-sectional view showing the optical waveguide according to another exemplary embodiment.

While the first cladding 18 is formed in a layer form on the entire area of the upper cladding substrate 14 having the same size as the lower cladding substrate 12 in order to close the opening on the side of the upper cladding substrate 14 and covers the entire area of the waveguide core 16 and the second cladding 20, the present invention is not limited thereto. For example, as shown in FIGS. 6 to 8, the first cladding 18 may be formed in a layer form on the entire area of the upper cladding substrate 14 of a size sealing only a peripheral area of the opening so as to cover only the peripheral area of the opening. While it is preferable that the first cladding 18 be formed of the same material as the second cladding 20, it may be formed of a different material.

In the optical waveguide 10 according to the present exemplary embodiment, the inclined surface in the cavity 22 inclined with respect to the direction of the propagating light through the main waveguide cores 16A and 16B serves as a reflecting surface 22A because of the difference in refractive index between the waveguide core 16 and the cavity 22. That is, the propagating light incident from the incident side 16C of the main waveguide core 16A reaches the cavity 22, is reflected at the reflecting surface 22A (inclined surface) in the cavity 22, propagates through the main waveguide core 16B, and exits from the exit side 16D.

That is, in the optical waveguide 10 according to the present exemplary embodiment, the cavity 22 the reflection angle and reflection amount of which are optically set is present inside the waveguide core 16, the boundary between the cavity 22 and the waveguide core 16 serves as the reflecting surface, and a change of the propagation direction is realized using the fact that the difference in refractive index between the core and the medium (gas) in the cavity 22 is comparatively large. The cavity 22 is regarded as a local gas cladding in the waveguide core 16. For example, when the refractive index of the waveguide core 16 is 1.5 and the gas in the cavity 22 is air, a total reflection of up to 41.8 degrees with reference to the normal to the reflecting surface (93.2 degrees with reference to the propagation direction) can be realized.

More specifically, when the refractive index of the waveguide core 16 formed of a polymer is 1.55 and air is selected as the gas in the cavity 22, the critical angle with respect to the normal to the reflecting surface 22A is approximately 40 degrees, and when the angle of the reflecting surface with respect to the propagation direction is 45 degrees, total reflection is possible, so that the propagation direction can be changed by 90 degrees.

That is, the reflecting surface 22A can be set at an inclination angle that totally reflects the propagating light, and when the refractive index of the waveguide core is $n_c$ and the refractive index of the medium in the cavity 22 is $n_g$, the critical angle of total reflection is $$\theta = \sin^{-1}(n_g/n_c).$$

When optical fibers are connected to the incident side 16C and the exit side 16D of the optical waveguide 10, although the difference in numerical aperture (NA) is pointed out from the viewpoint of the coupling loss of light, the refractive index of the cavity 22 in the waveguide core 16 is not involved since the NA based on the refractive indices of the optical waveguide core and the cladding wholly surrounding the core is applied thereto.

In the optical waveguide 10 of the present exemplary embodiment, the area (reflection effective area) of the overlapping part of the cross section of the main waveguide core 16A and the projection when the reflecting surface 22A is projected in the light propagation direction of the main waveguide core 16A is the same as the cross-sectional area of the main waveguide core 16A. In other words, when the effective reflecting surface is the same as the core size when viewed from the incident side, the light propagating through the main waveguide core 16A has its propagation direction changed at the reflecting surface by total reflection.

When the propagation light is reflected at the reflecting surface 22A at an angle same with or extremely close to the angle of total reflection, the light is branched into totally reflected light and partially transmitted light, so that a branching waveguide can also be realized.

When the area of the overlapping part of the cross section of the main waveguide core 16A and the projection when the reflecting surface 22A is projected in the light propagation direction of the main waveguide core 16A is smaller than the cross section of the main waveguide core 16A, a branching waveguide can be realized that branches the propagating light incident on the main waveguide core 16A into light reflected at the reflecting surface 22A and light propagating through the part of the main waveguide core 16A other than the reflecting surface 22A to propagate in a straight line. In other words, when the area is smaller than the reflecting surface side core size when viewed from the incident side, the light reflecting on the surface has its propagation direction changed by reflection, and the light not reflecting propagates through the main waveguide core without its direction changed, so that a wide branching angle waveguide can be realized.

As described above, in the optical waveguide 10 according to the present exemplary embodiment, the cavity 22 is present inside the waveguide core 16, and the propagation direction is changed with the boundary between the waveguide core 16 and the cavity 22 as the reflecting surface. That is, since the reflecting surface 22A constituted by the boundary between the waveguide core 16 and the cavity 22 where a gas is enclosed is provided inside the waveguide core 16, the propagation direction is changed locally and in a space-saving manner in a given position in the waveguide core 16.

In addition, since the opening of the cavity 22 is closed by the first cladding 18, the cavity 22 is formed without any foreign matter entering therein when the optical waveguide is manufactured. Consequently, an excellent reflecting surface is formed, so that an optical waveguide with a stable reflection characteristic is provided.

It is preferable that the optical waveguide 10 according to the present exemplary embodiment be used in the multimode.

Hereinafter, a method of manufacturing the optical waveguide according to the exemplary embodiment will be described.

The method of manufacturing the optical waveguide according to the exemplary embodiment includes, for example, the following steps 1) to 6):

1) forming, on a first substrate, a waveguide core through which light propagates and a cavity that is open in the surface opposite to the surface of the first substrate in the waveguide core in the thickness direction thereof;

2) forming a first curable cladding resin layer (first curable resin) onto a second substrate;

3) disposing the first substrate and the second substrate such that the side of the first substrate where the waveguide core is formed and the side of the second substrate where the first curable cladding resin is applied face each other, and so that the opening of the cavity is sealed by the first cladding curable resin;

4) curing the first curable cladding resin to form a layer-form first cladding having a lower refractive index than the waveguide core;

5) filling a second curable cladding resin (second curable resin) into a space surrounded by the first substrate, the second substrate, and the waveguide core; and 6) curing the second curable cladding resin to form a second cladding surrounding the waveguide core and having a lower refractive index than the waveguide core.

The method of manufacturing the optical waveguide according to the exemplary embodiment will be described in the order of the steps with reference to the drawings. FIGS. 4A to 4E and 5A to 5F are process schematic views showing the method of manufacturing the optical waveguide according to the exemplary embodiment.

Figure 4A:
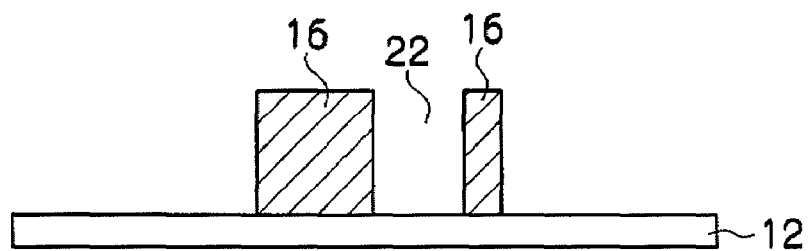
FIGS. 4A to 4E are process views showing a process of manufacturing the optical waveguide according to the exemplary embodiment.

In the step 1), the waveguide core 16 through which light propagates and the cavity 22 opened (in the present exemplary embodiment, one opening is closed by the lower cladding substrate 12 and the other is opened) on the surface opposite to the surface of the first substrate in the waveguide core 16 in the direction of thickness thereof are formed on the first substrate (in the present exemplary embodiment, the lower cladding substrate 12) (see FIG. 4A). As mentioned above, the cavity 22 is present inside the waveguide core 16, and with a part or the entire area of the boundary with the waveguide core 16 as the reflecting surface 22A, the direction of the propagating light is partly or wholly changed.

The step 1) includes, for example, the following steps a) to e):

a) preparing a mold 24 formed of a cured resin layer of a mold-forming curable resin and having a core-forming concave portion 24A corresponding to the waveguide core 16 and a cavity-forming convex portion 24B corresponding to the cavity 22;

b) attaching the lower cladding substrate 12 (cladding substrate) to the mold;

c) filling a curable core-forming resin into the core-forming concave portion 24A of the mold with which the lower cladding substrate 12 is in close contact;

d) curing the filled curable core-forming resin by heat or UV; and e) detaching the mold from the lower cladding substrate 12 to form, on the lower cladding substrate 12, the waveguide core 16 in which the cavity 22 is present so as to be partly opened.

Since in the step 1), the cavity 22 is formed simultaneously with the formation of the waveguide core 16 without the need for providing another step such as etching and equipment, therefore, manufacture is easy. Moreover, since in the step 1), the surface serving as the reflecting surface in the cavity 22 depends on the precision and flatness of the surface of the mold 24 corresponding to the cavity 22, the precision of the reflecting surface is easily improved by improving the surface precision and flatness of the mold 24.

First, an embodiment of the step 1), that is, the steps a) to e) will be described in the following:

In the step a), the mold 24 is prepared that is formed of a curable resin layer of a mold-forming curing resin and has the core-forming concave portion 24A corresponding to the waveguide core and the cavity-forming convex portion 24B corresponding to the cavity 22. While the mold 24 may be formed by using a master 26 where a convex portion 26A corresponding to the waveguide core 16 and a concave portion 26B corresponding to the cavity 22 are formed, the present invention is not limited thereto. In the following, a method using the master 26 will be described.

-Fabrication of the Master-

Figure 5A:
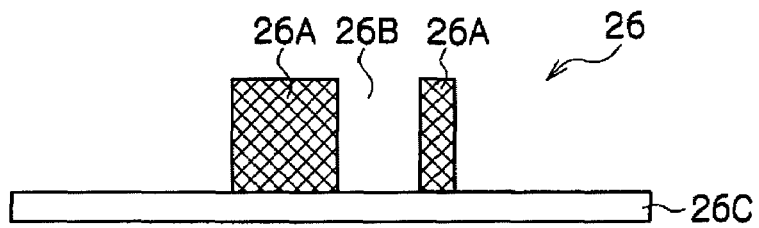
FIGS. 5A to 5F are process views showing the process of manufacturing the optical waveguide according to the exemplary embodiment.

In the master 26, the convex portion 26A corresponding to the waveguide core 16 and the concave portion 26B corresponding to the cavity 22 are formed on a substrate 26C (see FIG. 5A). For the fabrication of the master 26, a conventional method such as photolithography is used without any particular limitation. A method of manufacturing a polymer optical waveguide by an electrodeposition method or an optical electrodeposition method (JP-A No. 2002-333538) is also applicable to the fabrication of the master. The size of the convex portion corresponding to the waveguide core formed in the master depends on the use of the polymer optical waveguide or the like. For example, while it is typical that a waveguide core of approximately 10 μm square is used in the case of single-mode optical waveguides and a waveguide core of approximately not less than 50 μm and not more than 100 μm square is used in the case of multimode optical waveguides, an optical waveguide having a larger waveguide core of approximately several hundreds μm square is also used for some uses. For some uses of the optical waveguide, application to an optical waveguide having a larger waveguide core of approximately several hundreds μm square is possible. The size of the convex portion 26A corresponding to these waveguide cores can be set irrespective of the size of the concave portion 26B corresponding to the cavity 22.

-Fabrication of the Mold-

Figure 5B:
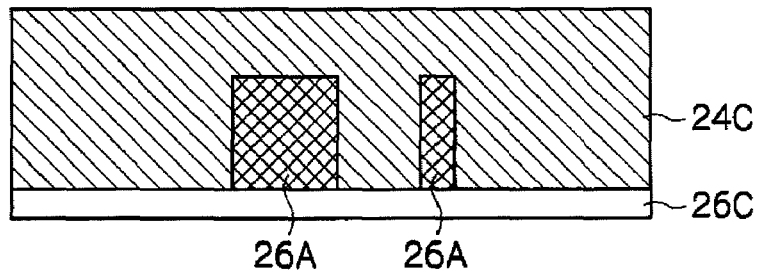
Figure 5C:
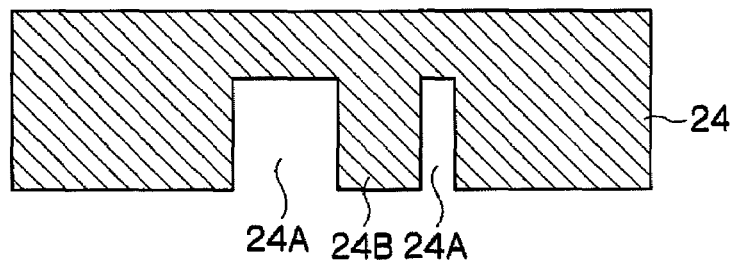

To fabricate the mold 24, first, the mold-forming curable resin is applied to or casted on the surface of the formed master 26 where the convex portion 26A corresponding to the waveguide core 16 and the concave portion 26B corresponding to the cavity 22 are formed, and after left for a predetermined time, the resin is vacuum degassed for ten minutes to form a mold-forming curable resin layer 24C (see FIG. 5B). After dried as required, the resin is cured. Then, the mold-forming curable resin layer 24C is detached from the master 26 to form the mold 24 where the core-forming concave portion 24A and the cavity-forming convex portion 24B are provided (see FIG. 5C).

In the mold 24, an inlet for filling the core-forming curable resin into the core-forming concave portion 24A and an outlet for discharging the resin from the core-forming concave portion 24A are formed (not shown), and their forming method is not specifically limited. While convex portions corresponding to the inlet and the outlet may be previously provided in the master 26, an example of a simple method is as follows: The mold-forming curable resin layer 24C is formed on the master 26 and separated therefrom to form the mold. Then, both ends of the mold are cut so that the core-forming concave portion 24A is exposed to thereby form the inlet and the outlet.

The thickness of the mold-forming curable resin layer 24C is determined in consideration of handleability as the mold 24, and its appropriate value is generally approximately not less than 0.1 mm and not more than 50 mm. Moreover, mold releasing processing such as application of a mold releasing agent may be previously performed on the master 26 to promote detaching from the mold.

Moreover, it is preferable for the mold-forming curable resin to be easily detached from the master 26 when cured, have a mechanical strength and a dimensional stability of not less than a predetermined level when formed into the mold 24 (repetitively used), have a hardness that maintains the concave and convex shapes, and is excellent in the adhesion to the lower cladding substrate. Various kinds of additives may be added to the mold-forming curable resin as required.

The mold-forming curable resin may have a viscosity of not more than a certain limit, for example, approximately not less than 500 mPa·s and not more than 7000 mPa·s since it can be applied to or casted on the surface of the master 26 and it is necessary to precisely copy the convex portion 26A corresponding to each waveguide core 16 and the concave portion 26B corresponding to the cavity 22 formed on the master 26 (the "mold-forming curable resin" used in the present invention includes one that becomes a gummous form having elasticity after cured). A solvent may be added to an extent that no adverse effect is produced by the solvent, to adjust the viscosity.

As the mold-forming curable resin, curing organopolysiloxane that becomes silicone rubber (silicone elastomer) or silicone resin after cured may be used from the viewpoint of separatability, mechanical strength, dimensional stability, hardness, and the adhesion to the lower cladding substrate as mentioned above. The above-mentioned curing organopolysiloxane may be one including a methylsiloxane group, an ethylsiloxane group, and a phenylsiloxane group in its molecules. Moreover, the above-mentioned curing organopolysiloxane may be either one-component type or two-component type used in combination with a curing agent, may be either a thermosetting type or a room temperature setting type (for example, one cured by moisture in the air at room temperature (for example, 25° C.)), or may be one using a different type of curing (ultraviolet curing, etc.).

It is preferable that the curing organopolysiloxane be one that becomes silicone rubber after cured. As this, one called liquid silicone rubber ("liquid" includes one having high viscosity such as paste) is normally used, and a two-component type used in combination with a curing agent is preferable. In particular, addition type liquid silicone rubber is preferably used because unevenness is suppressed in its surface and inside and it is hardened in a short time, produces no or little by-product when hardened, is excellent in mold releasability, and is low in shrinkage factor.

Among the liquid silicone rubbers, liquid dimethylsiloxane rubber is particularly preferable from the viewpoint of adhesion, detaching, strength, and hardness.

From the viewpoint of precisely copying the convex portion 26A corresponding to the waveguide core 16 and the concave portion 26B corresponding to the cavity 22 and decreasing the mixture of bubbles to facilitate the vacuum degassing and the viewpoint of forming a mold with a thickness of several millimeters, the viscosity of the liquid silicone rubber is preferably approximately not less than 500 mPa·s and not more than 7000 mPa·s, more preferably approximately not less than 2000 mPa·s and not more than 5000 mPa·s.

Further, it is preferable that the surface energy of the mold 24 be in a range of not less than 10 dyn/cm and not more than 30 dyn/cm, preferably in a range of not less than 15 dyn/cm and not more than 24 dyn/cm from the viewpoint of the adhesion to the substrate.

It is preferable that the share rubber hardness of the mold 24 be not less than 15 and not more than 80, preferably not less than 20 and not more than 60 from the viewpoint of molding performance, the maintenance of the concave shape, and separatability.

It is preferable that the surface roughness (root mean square roughness (RMS)) of the mold 24 be not more than 0.2 µm, preferably not more than 0.1 µm from the viewpoint of copying performance.

The mold 24 may transmit light in the ultraviolet region and/or the visible region. The mold 24 may transmit light in the visible region because positioning is easy when the mold 24 is brought into close contact with the lower cladding substrate 12 in the following step 2), filling the core-forming curable resin into the core-forming concave portion 24A of the mold 24 can be observed and the completion of filling and the like can be easily confirmed in the following step 3). Moreover, the mold 24 may transmit light in the ultraviolet region in order to perform ultraviolet curing through the mold 24 when an ultraviolet curable resin is used as the core-forming curable resin. The transmittance of the mold 24 in the ultraviolet region (not less than 250 nm and not more than 400 nm) may be not less than 80%.

Among curing organopolysiloxane, liquid silicone rubber that becomes silicone rubber after cured is excellent in mutually contradictory characteristics of adhesion and separatability to and from the lower cladding substrate, is capable of copying nanostructures, and even prevents the entrance of liquid when silicone rubber and the lower cladding substrate 12 are in close contact with each other. Since the mold 24 using this silicone rubber copies the master with high precision and is excellent in adhesion to the lower cladding substrate 12, the boundary serving as the reflecting surface between the waveguide core 16 and the cavity 22 and the side surface (the boundary with the surrounding cladding) of the waveguide core 16 are extremely excellent, the core-forming resin can be efficiently filled only in the core-forming concave portion 24A between the mold 24 and the lower cladding substrate 12, and the lower cladding substrate 12 is easily detached from the mold. Consequently, a polymer optical waveguide the shape of which is highly precisely maintained can be extremely easily formed by using the mold 24.

Moreover, when the mold-forming curable resin layer 24C, particularly, rubber elasticity is provided, part of the mold-forming curable resin layer 24C, that is, the part other than the part that copies the convex portion 26A and the concave portion 26B of the master 26 may be replaced with a different rigid material. In this case, the handleability of the mold 24 is improved.

Figure 5D:
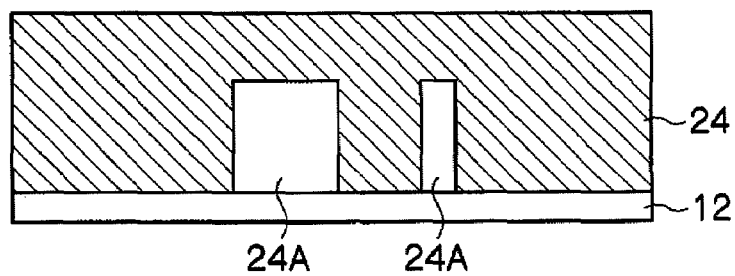
Figure 5E:
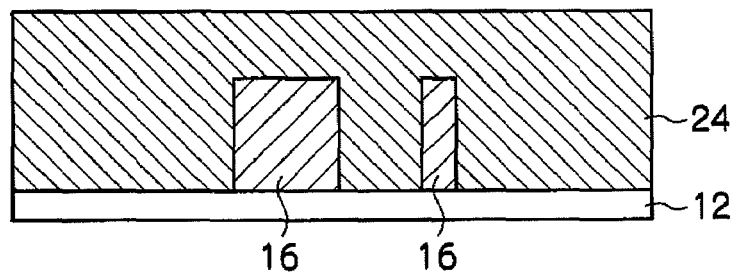

Then, in the step b), the lower cladding substrate 12 (cladding substrate) is brought into close contact with the mold 24 (see FIG. 5D).

The material of the lower cladding substrate 12 is selected in consideration of optical characteristic such as refractive index and light transmittance, mechanical strength, thermal stability, flexibility, and the like of the material according to the use. A polymer optical waveguide having flexibility may be formed by using a flexible film substrate.

Examples of the material of the film include acrylic resin (polymethyl methacrylate, etc.), alicyclic acrylic resin, styrene resin (polystyrene, acrylonitrile-styrene copolymer, etc.), olefin resin (polyethylene, polypropylene, ethylene-propylene copolymer, etc.), alicyclic olefin resin, vinyl chloride resin, vinylidene chloride resin, vinyl alcohol resin, vinyl butyral resin, arylate resin, fluorine-containing resin, polyester resin (polyethylene terephthalate, polyethylene naphthalate, etc.), polycarbonate resin, cellulose diacetate or triacetate, amide resin (aliphatic or aromatic polyamide, etc.), imide resin, sulfone resin, polyether sulfone resin, polyetherether ketone resin, polyphenylene sulfide resin, polyoxymethylene resin, and blends of resins mentioned above.

As the alicyclic acrylic resin, OZ-1000, OZ-1100 (manufactured by Hitachi Chemical Co., Ltd.), or the like in which an aliphatic cyclic hydrocarbon such as tricyclodecane is introduced into an ester substituent is used.

Moreover, examples of the alicyclic olefin resin include one having a norbornene structure in its main chain and one having a norbornene structure in its main chain and having a polar group such as alkyloxycarbonyl group (as the alkyl group, one with carbon numbers 1 to 6 and cycloalkyl group) in its side chain. Among them, the alicyclic olefin resin having a norbornene structure in its main chain and having a polar group such as alkyloxycarbonyl group in its side chain as mentioned above is particularly suitable for the formation of the polymer optical waveguide of the present invention because it has excellent optical characteristics such as low refractive index (the refractive index is in the vicinity of 1.50 and the difference in refractive index between the core and the cladding is secured) and light transmittance, is excellent in the adhesion to the mold, and is excellent in thermal resistance.

To secure the difference in refractive index from the core, it is preferable that the refractive index of the lower cladding substrate 12 be lower than 1.55, preferably lower than 1.53.

As the lower cladding substrate 12, a substrate with cladding in which another substrate is coated with a cladding material is usable. In this case, the flatness of the substrate is improved. In addition, a material unsuitable as a cladding material because of its high birefringence and a material inferior in transparency are also usable.

Then, in the step c), the core-forming curable resin is filled in the core-forming concave portion 24A of the mold 24 with which the lower cladding substrate 12 is in close contact. In this step, the core-forming curable resin is filled in the core-forming concave portion 24A other than the cavity-forming convex portion 24B of the mold 24 corresponding to the cavity 22, by a capillary action from the inlet of the mold 24, and the core-forming curable resin filled in the core-forming concave portion 24A is discharged from the outlet.

As the core-forming curable resin, resins such as radiation curing resin, electron beam curing resin, and thermosetting resin are usable. Among them, ultraviolet curing resin and thermosetting resin are preferably used. As the ultraviolet curing resin or the thermosetting resin for forming the core, an ultraviolet curing or thermosetting monomer or oligomer, or a mixture of a monomer and an oligomer is preferably used. As the ultraviolet curing resin, epoxy, polyimide, or acrylic ultraviolet curing resin is preferably used.

Since the core-forming curable resin is filled in the cavity formed between the mold 24 and the lower cladding substrate 12 (the core-forming concave portion 24A of the mold 24) by a capillary action, it is necessary that the core-forming curable resin being used be sufficiently low in viscosity. Therefore, it is preferable that the viscosity of the curable resin be not less than 10 mPa·s and not more than 2000 mPa·s, preferably not less than 20 mPa·s and not more than 1000 mPa·s, more preferably not less than 30 mPa·s and not more than 500 mPa·s.

In addition, in order to highly precisely reproduce the original shapes of the convex portion 26A corresponding to the waveguide core 16 and the concave portion 26B corresponding to the cavity 22 formed in the master 26, it is preferable that the volume change before and after curing of the core-forming curable resin be small. For example, a reduction in volume can cause a wave guiding loss. Therefore, the core-forming curable resin may be small in volume change, and it is preferable that the volume change be not more than 10%, preferably not more than 6%. Preferably, the use of a solvent to reduce viscosity is avoided if possible because it results in a large volume change before and after curing.

A polymer may be added to the core-forming curable resin in order to reduce the volume change (shrinkage) after curing. The polymer may be one being miscible with the core-forming curable resin and not adversely affecting the refractive index, elasticity, and transmission characteristic of the resin. By adding the polymer, the viscosity and the glass transition point of the curable resin are highly controlled as well as the volume change is reduced. While an acrylic, methacrylic acid, or epoxy polymer, for example, is used as the polymer, the present invention is not limited thereto.

It is necessary that the refractive index of the core-forming curable resin when the resin is cured be higher than that of the substrate serving as cladding, and the refractive index is not less than 1.50, preferably not less than 1.53. The difference in refractive index between the cladding (including the cladding layer in the following step d)) and the waveguide core is not less than 0.01, preferably not less than 0.03.

Moreover, in this step, in order to expedite the filling of the core-forming curable resin into the core-forming concave portion 24A of the mold 24 by a capillary action, the entire system may be decompressed (approximately not less than 0.1 Pa and not more than 200 Pa), or sucked by using a through hole.

Moreover, in order to expedite the filling of the core-forming curable resin, it is also an effective means to further reduce the viscosity by heating the core-forming curable resin filled from the inlet of the mold 24 in addition to the above-mentioned decompression of the system.

Then, in the step d), the filled core-forming curable resin is cured by heat or light. Thereby, the waveguide core 16 is formed (see FIG. 5E). For example, to cure ultraviolet curable resin, an ultraviolet lamp, an ultraviolet LED, or an ultraviolet radiation apparatus is used. To cure thermosetting resin, heating in an oven or the like is used.

Figure 5F:
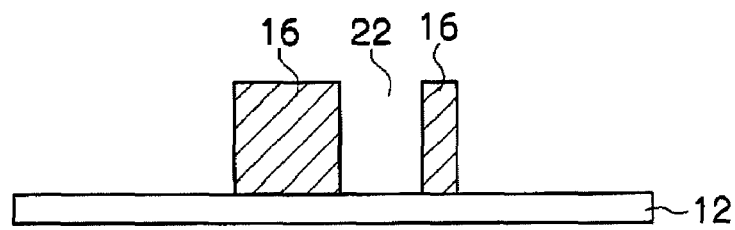

Then, in the step e), the mold 24 is detached from the lower cladding substrate 12, and the waveguide core 16 in which the cavity 22 is present so as to be partly opened is formed on the lower cladding substrate 12 (see FIG. 5F).

By the above-described steps, the waveguide core 16 in which the cavity 22 is present so as to be partly opened is formed. In the obtained cavity 22, the cavity 22 is surrounded by the inner wall of the waveguide core 16 and formed so as to be opened at both ends in the direction of thickness of the waveguide core 16, and the opening on the side of the lower cladding substrate 12 is closed by being sealed by the lower cladding substrate 12.

The method of forming the waveguide core 16 is not limited to the above-described manufacturing method, and the UV direct exposure method, the etching method or the like may be applied. However, it is preferable to select the above-described method from the viewpoint of cost and easiness.

Figure 4B:
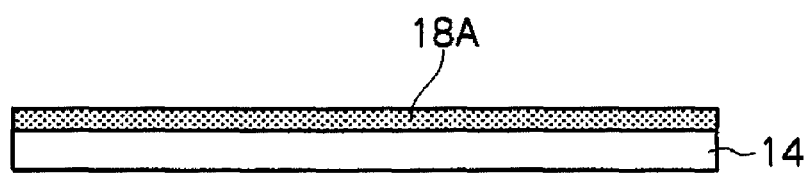

Then, in the step 2), the first cladding curable resin is applied in a layer form onto the second substrate (in the present exemplary embodiment, the upper cladding substrate 14), thereby forming a first cladding curable resin layer 18A (see FIG. 4B).

To apply the first cladding curable resin in a layer form onto the upper cladding substrate 14, for example, the first curable resin is dropped onto the upper cladding substrate 14 and then, the first cladding curable resin is enlarged by a centrifugal force by the spin coating method, so that the first cladding curable resin is uniformly applied in a layer form. The method of applying the first curable resin in a layer form is not limited to the spin coating method, and the casting method, the blade method, the printing method, or the like is also applicable. However, the spin coating method is preferable from the viewpoint of the resin being formed into a thin film easily at low cost.

Examples of the first cladding curable resin include ones similar to the cladding curable resin described later such as radiation curing resin, electron beam curing resin, and thermosetting resin. Among them, ultraviolet curing resin and thermosetting resin are preferable as the first curable resin. However, it is more preferable to select ultraviolet curing resin when deformation, peeling off and the like caused by expansion and shrinkage of the gas in the cavity 22 by the heat treatment are considered. As the ultraviolet curing resin or the thermosetting resin, an ultraviolet curing or thermosetting monomer or oligomer, or a mixture of a monomer and an oligomer may be used. As the ultraviolet curing resin, epoxy, polyimide, or acrylic ultraviolet curing resin may be used. To cure ultraviolet curing resin, an ultraviolet lamp, an ultraviolet LED, an ultraviolet radiation apparatus, or the like may be used. The material of the first cladding curable resin is preferably the same as that of the second curable resin for forming the second cladding 20 described later. It is to be noted that the material of the first cladding curable resin may be different from that of the second curable resin.

The thickness of the first cladding curable resin layer 18A is preferably not more than 15 μm, more preferably not more than 10 μm, and its lower limit is 5 μm. Although it depends on the viscosity, when the thickness of the first cladding curable resin is not less than a predetermined value, there are cases where the first cladding curable resin enters the cavity 22 when sealing the cavity 22 and because of this, the residual gas becomes bubbles and the reflecting surface is not flat; thus the object is not achieved. In addition, there are cases where yield decreases. For this reason, the thickness of the first cladding curable resin layer 18A is preferably within the above-mentioned range.

To form a thin film, make the sealing performance excellent when the first cladding curable resin seals the opening of the cavity 22, and suppress the entrance of the first cladding curable resin into the cavity 22, it is preferable that the first cladding curable resin layer 18A be improved in viscosity, that is, have its fluidity suppressed after formed into a layer form. Concrete examples of the method therefor include a method in which the first cladding curable resin layer 18A is incompletely cured and a method in which the first cladding curable resin layer 18A is cured so that the inside is cured with the surface uncured or incompletely cured.

According to the method in which the first cladding curable resin layer 18A is incompletely cured, viscosity is increased and fluidity is suppressed compared to the condition where the first cladding curable resin layer 18A is not solidified and is unsolid and cured. Incomplete curing the first cladding curable resin layer 18A is realized by performing the curing processing under a less strict condition than the condition for complete curing. Concrete examples include reducing the processing time and reducing the imparted energy (for example, ultraviolet ray, electron beam, heat). The condition for the incomplete curing is adjustable according to the kind of the first cladding hardening resin.

Here, "incompletely cured" is a condition where the curing reaction is caused only partly, and means that the viscosity is higher than that of the first cladding curable resin in the unhardened state.

According to the method in which the first cladding curable resin layer 18A is cured so that the inside is cured with the surface uncureds or incompletely cured, fluidity is suppressed since only the inside of the first curable resin is cured to be solidified and only the surface is cured or incompletely cured. Curing the first cladding curable resin layer 18A so that the inside is cured with the surface uncured or incompletely cured is realized by applying an ultraviolet curing radical polymer material (for example, acrylic resin) as the first cladding curable resin and curing the first cladding curable resin by ultraviolet rays in an atmosphere containing oxygen. The ultraviolet curing radical polymer material is difficult to harden because of oxygen inhibition. When it is cured in an atmosphere containing oxygen, because of oxygen inhibition, only the surface of the first curable resin that is in contact with oxygen is difficult to cure and is consequently uncured or incompletely cured. On the other hand, in the inside of the first curable resin which is not in contact with oxygen and is therefore not subject to oxygen inhibition, the curing reaction proceeds so that the resin is solidified.

By sealing the opening of the cavity 22 by the first cladding curable resin layer 18A in any one of these states, the sealing performance when the first cladding curable resin layer 18A covers the opening of the cavity 22 is excellent and the entrance of the first cladding curable resin into the cavity 22 is suppressed. Consequently, the entrance of other foreign matter into the cavity 22 is also suppressed, so that an excellent reflecting surface can be maintained. Therefore, the optical waveguide has stable optical characteristics.

While the first cladding curable resin layer 18A may be formed over the entire area of the upper cladding substrate 14 having the same size as the lower cladding substrate 12, it may be formed on the upper cladding substrate 14 that has a size corresponding only to a peripheral area of the cavity 22 (see FIGS. 6 to 8). In a case where the first cladding curable resin layer 18A is provided only on the periphery of the area sealing the opening on the side of the upper cladding substrate 14 in the cavity 22, for example, when the second curable resin is filled in the space surrounded by the lower cladding substrate 12, the upper cladding substrate 14 and the waveguide core 16 by using a capillary action, suction or both of them, the distance is reduced, so that the time for filling the second curable resin is reduced. The method of applying the cladding to the remaining periphery of the core is not specifically limited. In doing this, the area may be further covered by a third substrate.

Figure 4C:
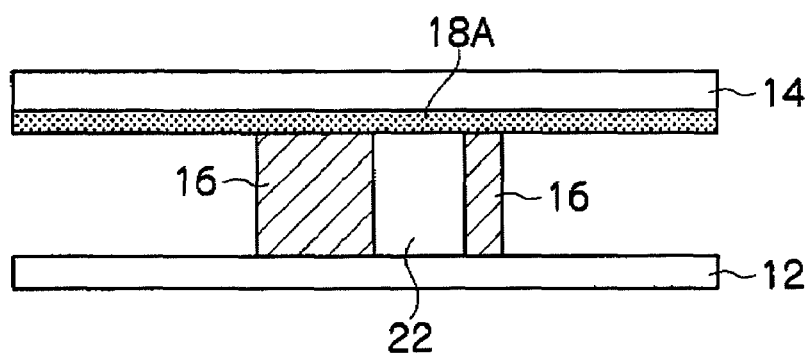

Then, in the step 3), the lower cladding substrate 12 and the upper cladding substrate 14 are disposed to face each other and the opening (in the present exemplary embodiment, the opening on the side of the upper cladding substrate 14) of the cavity 22 is sealed by the first cladding curable resin, thereby isolating the gas in the cavity 22 (see FIG. 4C). This step is performed in an atmosphere of the residual gas in the cavity 22 while a predetermined pressure is applied between the lower cladding substrate 12 and the upper cladding substrate 14, that is, while a predetermined pressure is applied to the surface of the waveguide core 16.

As the gas isolated in the cavity 22, a gas under the waveguide formation environment may be used because of ease of manufacture. As the gas isolated in the cavity 22, for example, air surrounding the lower cladding substrate 12 is convenient and is preferable from the viewpoint of cost. Since the atmosphere in this step serves as the medium in the cavity 22 as it is, the opening of the cavity 22 is sealed by the first cladding curable resin in the atmosphere of air, whereby the gas in the cavity 22 is isolated.

Figure 4D:
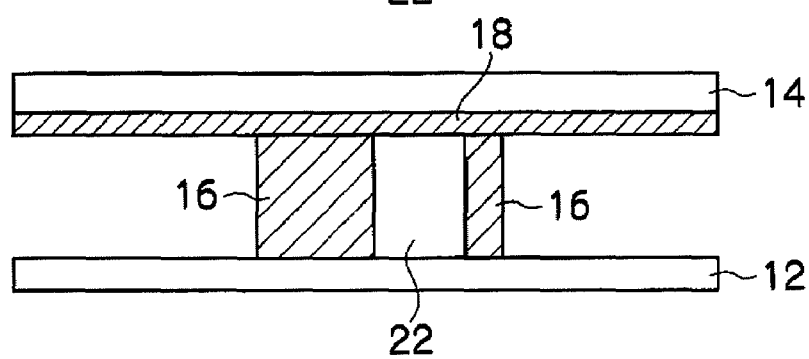

Then, in the step 4), the first cladding curable resin is cured to form the first cladding 18 (see FIG. 4D). This curing is performed, for example, by ultraviolet exposure when the first cladding curable resin is an ultraviolet curing type, and by heating when it is a thermosetting type. When a material difficult to cure because of oxygen inhibition such as an ultraviolet curable radical polymer material is used as the first cladding curable resin, the resin is cured in an environment where oxygen is absent (for example, in a noble gas environment, or in a nitrogen environment).

In a case where a thermosetting type is used as the first cladding curable resin, when the gas remaining in the cavity 22 thermally expands by the heat treatment or the like in the curing by heating, there are cases where peeling off of optical waveguide components (cladding substrates, waveguide cores, claddings, etc.), an increase or decrease in the width of the waveguide core 16, deformation of the waveguide core 16, a displacement of the waveguide core 16 distance and the like are caused. Therefore, to avoid the influence of the thermal expansion of the gas isolated in the cavity 22, for example, the first cladding curable resin is preferably hardened with the cavity 22 being vacuum. However, this method is not preferable because an expensive vacuum apparatus is required and the number of steps is increased.

By way of the above-described steps, the cavity 22 is enclosed with the gas isolated therein, and the cavity 22 is isolated from the outside.

Then, the second cladding curable resin is filled in the space surrounded by the lower cladding substrate 12, the upper cladding substrate 14, and the waveguide core 16. The second cladding curable resin is filled, for example, from an opened end of the space by using a capillary action. In that case, the filling speed may be increased by performing decompression suction from the other opened end of the space.

As the second cladding curable resin, a resin such as radiation curing resin, electron beam curing resin, or thermosetting resin may be used. Among them, ultraviolet curing resin and thermosetting resin are preferably used. However, it is preferable to select ultraviolet curing resin when deformation, peeling off and the like caused by expansion and shrinkage of the gas trapped in the cavity 22 by the heat treatment are considered. As the ultraviolet curing resin or the thermosetting resin, an ultraviolet curing or thermosetting monomer or oligomer, or a mixture of a monomer and an oligomer is preferably used. As the ultraviolet curing resin, epoxy, polyimide, or acrylic ultraviolet curing resin is preferably used.

A polymer being miscible with the resin and not adversely affecting the refractive index, elasticity, and transmission characteristic of the resin (for example, a methacrylic acid or epoxy polymer) may be added to the second cladding curable resin in order to reduce the volume change (shrinkage) after curing of the resin. The polymer is preferably added to the first cladding curable resin as well.

In particular, in a combination using as the mold-forming curable resin a liquid silicone rubber, a liquid dimethylsiloxane rubber that becomes rubber when cured and using as the cladding substrates (upper and lower cladding substrates) alicyclic olefin resin having a norbornene structure in its main chain and having a polar group such as alkyloxycarbonyl group in its side chain, the adhesion between them is particular high, no deformation of the concave structure of the mold occurs, and the second cladding curable resin may be quickly filled into the concave portion by a capillary action even when the cross-sectional area of the concave structure is extremely small (for example, a rectangle of 10×10 µm).

Moreover, since the opening of the cavity 22 is sealed with the first cladding 18, as the second cladding curable resin, one with a lower viscosity (for example, a viscosity (25° C.) of not less than 10 mPa·s and not more than 4000 mPa·s, preferably not less than 10 mPa·s and not more than 500 mPa·s) is selectable from the viewpoint of the filling speed.

Figure 4E:
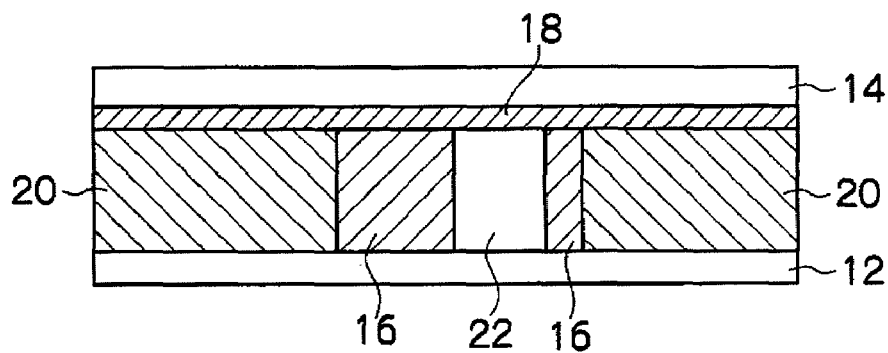

Then, in the step 6), the second cladding curable resin is cured to surround the waveguide core 16, thereby forming the second cladding 20 having a lower refractive index than the waveguide core 16 (see FIG. 4E). This curing is performed, for example, by ultraviolet exposure when the second cladding curable resin is an ultraviolet curing type, and by heating when it is a thermosetting type. To cure ultraviolet curable resin, for example, an ultraviolet lamp, an ultraviolet LED, or an ultraviolet radiation apparatus is used. To cure thermosetting resin, heating in an oven is used.

To secure the difference in refractive index from the waveguide core 16, it is preferable that the refractive index of the claddings (the second cladding 20 and the first cladding 18) be not more than 1.55, more preferably not more than 1.53. Moreover, the difference in refractive index between the cladding substrate and the cladding is preferably small. It is preferable that the difference be within 0.05, more preferably within 0.001, and even more preferably 0 from the viewpoint of trapping light.

By way of the above-described steps, both end surfaces in the direction of length of the optical waveguide are cut by a dicing saw or the like so as to be perpendicular or inclined with respect to the optical waveguide surface as required, thereby manufacturing the optical waveguide 10. It is to be noted that the method of cutting both end surfaces of the optical waveguide is not limited to the cutting method by a dicing saw.

In the present exemplary embodiment, two or more through holes respectively communicating with one end and the other end (the inlet and the outlet for filling and discharging the core-forming curable resin) of the core-forming concave portion 24A corresponding to the waveguide core 16 may be formed in the mold 24. In this case, the core-forming curable resin is put in the through hole at one end of the core-forming concave portion 24A of the mold 24, and by performing decompression suction from the through hole at the other end of the core-forming concave portion 24A of the mold 24, the core-forming curable resin is filled into the core-forming concave portion 24A of the mold 24. By filling the core-forming curable resin by using the mold 24 as described above, the filling speed is significantly increased, and the adhesion between the mold 24 and the lower cladding substrate 12 is further improved, so that the entrance of bubbles is avoided.

The number of through holes to fill or vacuum the waveguide core resin may be two or more. For example, in the case of a branching waveguide, three through holes are necessarily provided, and when Y-branches are provided in three positions to branch one path into eight, nine through holes are necessarily provided in the mold 24 to fill the core-forming curable resin into the core-forming concave portion 24A. The branching also includes multistage branching.

The through hole provided on the side of entrance of the core-forming curable resin has the function of storing liquid (core-forming curable resin). The through hole provided on the side of discharge of the core-forming curable resin is used for the decompression suction for decompressing the core-forming concave portion 24A of the mold 24 when the resin is filled into the core-forming concave portion 24A of the mold 24. The configuration and size of the through hole on the entrance side is not specifically limited as long as the through hole communicates with the entrance end of the concave portion and has the liquid storing function. The configuration and size of the through hole on the discharge side is not specifically limited as long as the through hole communicates with the discharge end of the core-forming concave portion 24A of the mold 24 and can be used for decompression suction.

Since the through hole provided on the side of entrance of the core-forming curable resin of the core-forming concave portion 24A of the mold 24 has the liquid storing function, by its cross section being large on the side in contact with the cladding substrate (lower cladding substrate 12) and decreasing with distance from the substrate when the mold 24 is in close contact with the substrate, the mold 24 and the lower cladding substrate 12 are easily separated from each other after the core-forming curable resin is filled in the core-forming concave portion 24A of the mold 24 and cured. Since it is unnecessary for the through hole on the side of discharge of the core-forming curable resin to have the liquid storing function, it is not particularly necessary to adopt this cross-sectional structure to the through hole.

For the mold 24 having a through hole, for example, a method is employed where a mold is formed in which the core-forming concave portion 24A corresponding to the waveguide core 16 and the cavity-forming convex portion 24B corresponding to the cavity 22 are formed as described above, and the through hole is formed by punching the mold in a predetermined shape. In doing this, the mold is punched so that the inlet for filling the core-forming curable resin and the outlet for discharging the core-forming curable resin from the concave portion appear inside the through hole. Even in the case of the punched through hole, since the adhesion between the mold and the cladding substrate is excellent and no cavity is formed with the cladding substrate (lower cladding substrate 12) other than the core-forming concave portion 24A of the mold, there is no possibility that the core-forming curable resin enters a part other than the core-forming concave portion 24A.

The through hole may be formed so that a part of the mold is left in the direction of thickness of the mold 24 as well as the type (punched type) in which the curing resin layer is all removed in the direction of thickness of the mold 24 as described above. In this case, the mold is placed below the lower cladding substrate 12 so that the through hole is exposed.

Another example of the formation of the mold having a through hole is a method in which a convex portion for forming a through hole (in the case of a punched-type through hole, the height of the convex portion is higher than the thickness of the curing resin layer of the mold-forming curing resin) is provided on the master 26 as well as the convex portion 26A corresponding to the waveguide core 16, the mold-forming curable resin is applied to this master so that the convex portion for forming a through hole penetrates through the resin layer (punched-type through hole) or that the convex portion is hidden and then, the curable resin layer is cured and detached from the master.

In the above-described method of manufacturing the optical waveguide 10 according to the present exemplary embodiment, the opening of the cavity 22 provided in the lower cladding substrate 12 is closed by the first cladding curable resin layer 18A in a incompletely cured state where at least its surface is uncured, and then, the first cladding hardening resin layer 18A is cured to form the first cladding. Thereafter, the second cladding curable resin is filled in the space surrounded by the upper cladding substrate 14, the lower cladding substrate 12 and the waveguide core 16, and is cured to form the second cladding 20. Consequently, the opening (the opening on the side of the upper cladding substrate 14) of the cavity 22 is sealed by the first cladding 18 with excellent adhesion when the second cladding curable resin is filled, so that the entrance of the second cladding curable resin into the cavity 22 is suppressed. The other opening (the opening on the side of the lower cladding substrate 12) of the cavity 22 is also formed with excellent adhesion by the lower cladding substrate 12 since the core-forming curable resin is applied and cured on the lower cladding substrate 12 to form the waveguide core 16. Consequently, the entrance of the second cladding curable resin from the other opening is also suppressed. Consequently, the cavity 22 is present inside the waveguide core 16 with the entrance of foreign matter being suppressed. As a result, an optical waveguide is obtained in which it is suppressed that the optical characteristic becomes unstable.

While an embodiment in which the cavity 22 is used for forming the reflecting surface to reflect the propagating light to the waveguide core 16 is described as an optical waveguide 10 and a method of manufacturing the same according to the present exemplary embodiment, the cavity 22 is not limited thereto. It is also applicable to an embodiment in which the cavity is present inside a member such as the waveguide core 16 of the optical waveguide or a line similar thereto such as an alignment mark.

EXAMPLES

While examples will be shown below to more concretely describe the present invention, the present invention is not limited to these examples.

Example 1

A polymer optical waveguide is formed that has the same structure as the optical waveguide shown in FIGS. 1 to 3 and has a 90-degree reflecting cavity in the waveguide core.

(Fabrication of the Master))

A thick film resist is applied to Si substrate. Then, the substrate is prebaked at 80° C., and is exposed and developed through a photomask, thereby forming a core-forming convex portion (core width: 50 μm, core height: 50 μm) corresponding to the configuration of the core and a cavity-forming concave portion (depth: 50 μm) corresponding to the configuration of the cavity. The formed master is postbaked at 120° C. to complete the master.

(Fabrication of the Mold)

Then, after a releasing agent is applied to the master, thermosetting dimethylsiloxane resin (SYLGARD 184 manufactured by Dow Corning Asia, Ltd.) is poured therein, left for a predetermined time, vacuum degassed for ten minutes, and heated at 120° C. for 30 minutes to be solidified. Then, the master is detached to form the mold having the cavity-forming convex portion and the core-forming concave portion. A hole with a diameter of 3 mm is formed in each of two positions on a line connecting the core-forming concave portions to form the filling hole and the suction hole.

(Formation of the Waveguide Core Having a Cavity Opened at the Top)

Then, a film substrate (ARTON FILM manufactured by JSR Corp., refractive index: 1.51) with a thickness of 188 μm is prepared as the lower cladding substrate, and the mold is brought into close contact therewith. Then, an ultraviolet curable resin with a viscosity of 800 mPa·s (refractive index after hardening: 1.54) is filled in the filling hole formed in the mold, and suction is performed through the suction hole by a suction pump, so that the ultraviolet curable resin is filled in the core-forming concave portion while the cavity remains. Then, the resin is irradiated with an ultraviolet ray of 50 mW/cm$^2$ through the mold (dimethylsiloxane resin) for ten minutes to be cured. Thereafter, the mold is detached to form the waveguide core having a cavity opened at the top, on the lower cladding substrate.

(Formation of the First Cladding Hardening Resin Layer on the Upper Cladding Substrate)

An acrylic ultraviolet curable resin (ultraviolet curable radical polymer material, refractive index after curing: 1.51, viscosity: 360 mPa·s) is dropped onto a film (ARTON FILM manufactured by JSR Corp., refractive index: 1.51) with a thickness of 188 μm as the upper cladding substrate, and the first cladding curable resin layer with a thickness of 8 μm is formed by the spin coating method. Then, an ultraviolet ray is dosed thereto in air atmosphere to perform the curing processing. When the first cladding curable resin layer having undergone the curing processing is observed, the surface is uncured and viscous although the inside is cured to be solidified.

(Sealing of the Opening of the Cavity by the First Cladding Curable Resin Layer and Curing)

In air atmosphere, the upper cladding substrate where the first cladding curable resin layer is formed and the lower cladding substrate where the waveguide core and the cavity are formed are disposed so as to face each other and adhered to each other under a predetermined pressure, and the opening of the cavity is sealed by the first cladding curable resin layer to thereby trap gas (air) in the cavity. Thereafter, by applying an ultraviolet ray of 50 mW/cm$^2$ for ten minutes, the first cladding hardening resin is cured to form the first cladding. When the inside of the cavity is observed, no entrance of the first cladding curable resin into the cavity is found.

(Filling and Curing of the Cladding Curable Resin)

To fill the second cladding curable resin in the space surrounded by the upper cladding substrate, the lower cladding substrate, and the waveguide core, and an ultraviolet curable resin (refractive index after curing: 1.51, viscosity (25° C.): 360 mPa·s) is dropped to the end of the space and filled by using a capillary action. Thereafter, by applying an ultraviolet ray of 50 mW/cm$^2$ for ten minutes, the second cladding resin is cured to form the second cladding. When the inside of the cavity is observed, no entrance of the second cladding curable resin into the cavity is found.

Lastly, to form the end of the optical waveguide, the end of the optical waveguide is cut out by using a dicing saw.

By the above-described steps, an optical waveguide film is formed in which air is sealed in and a cavity serving as the reflecting surface is provided.

A Gaussian beam with a wavelength of 850 nm emitted from a Fabry-Perot laser diode is made incident on the formed optical waveguide through an optical fiber, the light quantity is measured by a light intensity measuring instrument on the waveguide after reflection, and the reflection loss is calculated. The result of the calculation is 0.5 dB.

Example 2

The first cladding curable resin layer is formed on the upper cladding substrate, and is left for 90 minutes in room temperature environment. When the first cladding curable resin layer after this processing is performed is observed, the cladding curable resin is incompletely cured and viscous. By the same process as that of example 1 other than this, an optical waveguide is formed.

A Gaussian beam with a wavelength of 850 nm emitted from a Fabry-Perot laser diode is made incident on the formed optical waveguide through an optical fiber, the light quantity is measured by a light intensity measuring instrument at the end of the waveguide after reflection, and the reflection loss is calculated. The result of the calculation is 0.5 dB, which is equal to that of example 1.

The foregoing description of the embodiments of the invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practice applications, thereby enabling others skilled in the art to understand invention for various embodiments and with the various modifications as are suited to the particular use contemplated. It is intended that the scope of the invention be defined by the following claims and their equivalents.

What is claimed is:

1. A method of manufacturing an optical waveguide, the method comprising:
   forming, on a first substrate, a waveguide core through which light propagates and with a cavity that is open in the waveguide core at the surface opposite to the surface of the first substrate in the waveguide core thickness direction;
   applying a first curable resin in a layer form onto a second substrate;
   disposing the first substrate and the second substrate such that the side of the first substrate where the waveguide core is formed and the side of the second substrate where the first curable resin is applied face each other, and so that the opening of the cavity is sealed by the first curable resin;
   curing the first curable resin to form a layer-form first cladding having a lower refractive index than the waveguide core;
   filling a second curable resin into a space surrounded by the first substrate, the second substrate, and the waveguide core; and
   curing the second curable resin to form a second cladding surrounding the waveguide core and having a lower refractive index than the waveguide core.

2. The method of manufacturing an optical waveguide according to claim 1,
   wherein the first curable resin is incompletely cured, and the opening of the cavity is sealed by the first curable resin in this state.

3. The method of manufacturing an optical waveguide according to claim 1,
   wherein the first curable resin is cured so that the inside thereof is cured while the surface thereof is uncured or is incompletely cured, and the opening of the cavity is sealed by the first curable resin in this state.

4. The method of manufacturing an optical waveguide according to claim 1,
   wherein the first curable resin is an ultraviolet curing radical polymer material, and the first curable resin is cured by ultraviolet rays in an atmosphere containing oxygen, and the opening of the cavity is sealed by the first curable resin in this state.

5. The method of manufacturing an optical waveguide according to claim 1,
   wherein in the applying the first curable resin in the layer form onto the second substrate, the first curable resin is formed in the layer form by a spin coating method.

6. The method of manufacturing an optical waveguide according to claim 1,
   wherein the first curable resin applied in the layer form onto the second substrate is applied onto only the area of the opening of the cavity and the periphery thereof.

7. An optical waveguide comprising:
   a waveguide core through which light propagates;
   a cavity that is present inside the waveguide core so as to be open at least one end in the thickness direction of the waveguide core;
   a layer-form first cladding having a lower refractive index than the waveguide core, and sealing at least one opening of the cavity to thereby close the opening of the cavity; and
   a second cladding having a lower refractive index than the waveguide core, and surrounding the waveguide core,
   wherein the optical waveguide is manufactured according to the method of claim 1.

8. The optical waveguide according to claim 7,
   wherein the cavity acts as a reflecting surface at a boundary with the waveguide core, and changes a direction of only a portion of light propagating through the waveguide core.

9. The optical waveguide according to claim 7,
   wherein the cavity acts as a reflecting surface at a boundary with the waveguide core, and changes a direction of all light propagating through the waveguide core.

10. The optical waveguide according to claim 8,
    wherein the cavity extends throughout the entire thickness direction of the waveguide core.

* * * * *